United States Patent Office 3,413,056
Patented Nov. 26, 1968

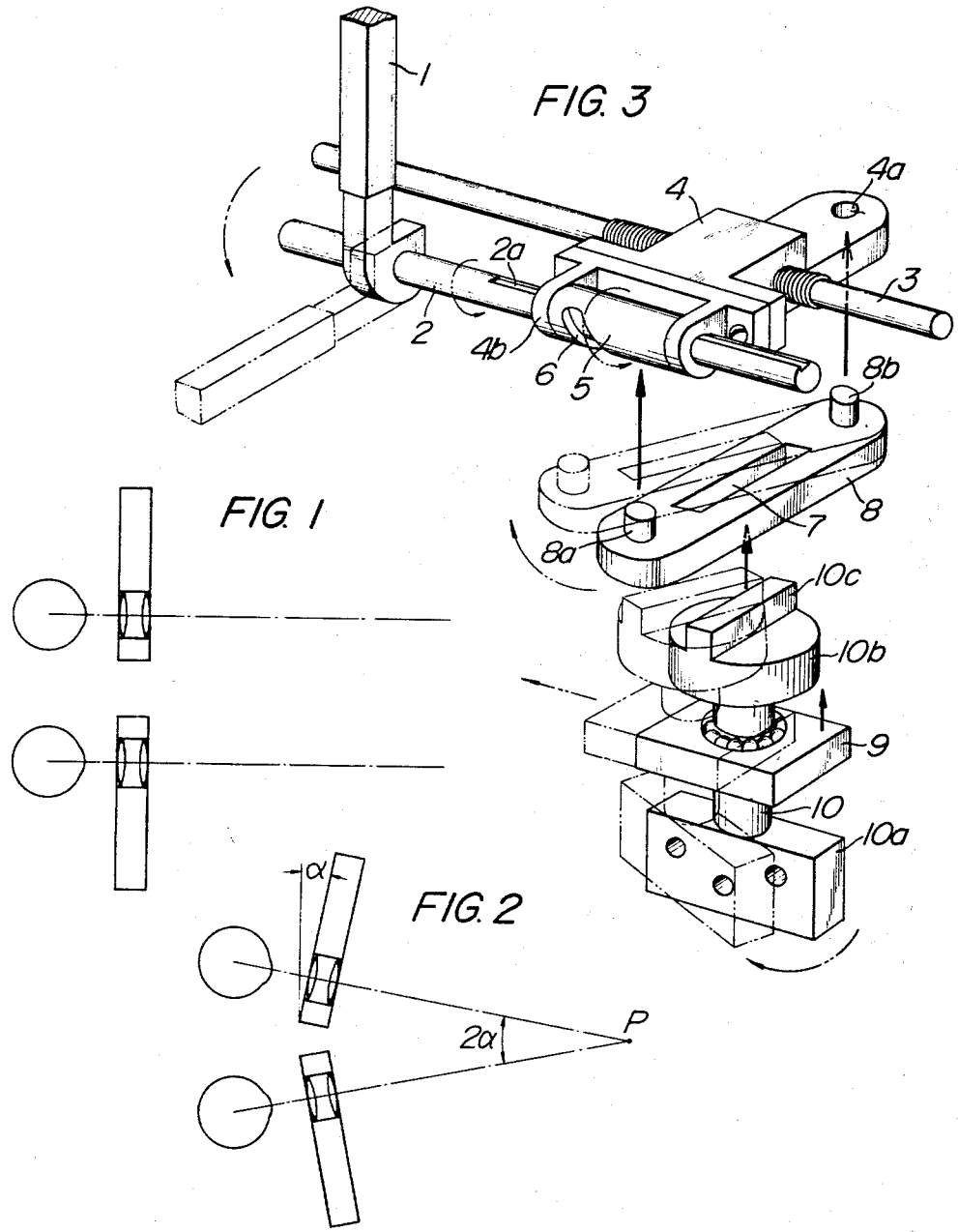

3,413,056
DEVICE FOR OPHTHALMIC INSTRUMENT FOR ADJUSTING INTERPUPILLARY DISTANCE AND ANGLE OF CONVERGENCE OF LENS CASES
Taketoshi Ishihara, Tokyo, Japan, assignor to Tokyo Kogakukikai Kabushiki Kaisha, Tokyo, Japan, a corporation of Japan
Filed June 30, 1965, Ser. No. 468,536
Claims priority, application Japan, Aug. 31, 1964, 39/50,921
2 Claims. (Cl. 351—28)

ABSTRACT OF THE DISCLOSURE

An ophthalmic instrument used in near and far vision testing having card holder means attached to cam means affixed to linking means which supports lens cases to be used in the vision test, said cam means and linking means joined in such a manner that by rotating the shaft containing cam means simultaneously results in the automatic adjustment of the interpupillary distance and in the angle of convergence of the lens cases affixed to said linking means.

---

This invention relates to an ophthalmic instrument through which a patient looks and by which the practitioner determines the needed refractive power based on the patient's responses to various tests. The various features and advantages of this invention will be hereinafter described in comparison with the conventional ophthalmic instrument with reference to the accompanying drawings, in which FIG. 1 is a diagrammatical plan view showing the relative positions of a patient's eyes and lens cases in a long-distance eye test using an ophthalmic instrument;

FIG. 2 is a diagrammatical plan view showing the relative positions of a patient's eyes and lens cases in a short-distance eye test using the same instrument; and FIG. 3 is a perspective view of the essential parts of the ophthalmic instrument of this invention showing those parts necessary for suspending one lens case (for the left eye) as they are disassembled.

The typical ophthalmic instrument is widely known under the name of Vision Tester and utilizes a pair of lens cases which are suspended side by side by means of stationary frame means, each of the lens cases having a rotary disk mounted coaxially therein and an eye hole, said rotary disk having also a multiplicity of lenses arranged and fixed along the periphery thereof. In practice a patient looks at a visual map or an eye examination card placed in front of him through the pair of eye holes. The practitioner asks the patient how he can see the visual map or examination card by way of making tests for presbyopia, near visual acuity, phoria, a power of convergence and divergence, accommodation, binocular balance test, etc. as well as for hypermetropia, myopia and astigmatism.

Generally in a long-distance test, among the various tests mentioned above, the visual map is placed at approximately 5 meters in front of the ophthalmic instrument through which the patient looks thereat. In that case the lines of vision of the patient's right and left eyes can be thought to be parallel with each other as shown in FIG. 1. Therefore, the pair of lens cases suspended by the frame means are placed in the same plane which intersects the lines of vision at right angles. On the other hand, in a short-distance test for presbyopia, near visual acuity, near phoria, etc. the examination card is placed at about 25–40 cm. in front of the patient's eyes. More precisely, the examination card is hung on a rod which is disposed at the middle of the frame means from which the lens cases are suspended and fixed; in use this rod is rotated 90 degrees from an upright position to horizontal one and is held horizontally for the short-distance tests. Assuming now that the patient's lines of vision make an angle $2\alpha$ as shown in FIG. 2, the respective lens cases should be turned by an angle $\alpha$ in symmetrical relation relative to the patient's face so that the patient's lines of vision may correspond with the optical axes of the lenses. Then arrangement for short-distance tests has been completed.

With the conventional ophthalmic instrument this turning of the lens cases has been troublesome, because each of the lens cases is arranged to be turned independently of the other. In addition to the troublesome operation, there has been possibility with the conventional instrument of the practitioner's performing short-distance tests with the lens cases remaining at the positions of FIG. 1 or, vice versa, performing long-distance tests with the lens cases remaining at the positions of FIG. 2 by mistake.

This invention aims at elimination of the above mentioned defect. According to this invention, there is provided an ophthalmic instrument in which turning down of the reading rod for hanging the examination card in order to change the instrument from the position for long-distance tests shown in FIG. 1 to the position for short-distance tests automatically performs the turning of the lens cases as far as the positions shown in FIG. 2 and at the same time adjusts the interpupillary distance between the lenses which is necessitated by the turning of the lens cases. When the reading rod which has been turned down is then raised up again, the lens cases are brought back to their original coplanar positions in coaction with the movement of the reading rod, and thereby the interpupillary distance is also readjusted. The distance at which the examination card is hung on the turned-down reading rod 1 from the patient's eyes or the position of point P in FIG. 1 varies with the conditions of the eye tests, while the turning angle $\alpha$ of the lens cases is fixed. Nevertheless, because the differences in the distance from the card are not so large as to practically cause any trouble in ordinary short-distance tests, such differences in distance can be safely ignored as far as this invention is concerned.

An embodiment of this invention will be explained with reference to FIG. 3. The figure is a perspective view of the essential parts of an ophthalmic instrument embodying the present invention. The parts are for suspending a lens case (not shown) for the left eye from stationary frame means (not shown). In the figure the parts are shown as they are longitudinally disassembled and diagonally seen down from the front outward side. As is well known, said stationary frame means is horizontally supported by a solid supporting reading rod. On the frame means there are provided a shaft 2 to which the base of a reading rod 1 is firmly secured and another shaft 3 which is provided with a feed screw thread for adjusting interpupillary distance, both of said shafts being rotatably horizontally supported in parallel with each other in front and in the rear.

A moving piece 4 is screwed on the feed screw thread of said shaft 3, and a pair of ears 4b incorporated in said moving piece 4 are loosely fitted on the front shaft 2. A cylinder 5 which is interposed between said pair of ears 4b is also loosely fitted on the front shaft 2, and a pin (not shown) firmly fitted to the inside surface of the cylinder 5 engages a linear groove 2a cut in the peripheral surface of the front shaft 2. The cylinder 5 is provided with a spiral slot 6 on the peripheral outer surface thereof.

Below the moving piece 4 there is horizontally located a link plate 8 having a slot 7 made lengthwise of the middle portion of the plate. A pin 8a firmly planted in the front upper side of said plate and another pin 8b firmly planted in the rear upper side of the plate loosely engage the slot 6 of said cylinder 5 and the through hole 4a of the rear end of the moving piece 4, respectively.

A sliding block 9, which is located below the link plate 8, is movably supported so as to be guided by a suitable member fixed to the stationary frame means not shown; the block 9 moves in either direction parallel with the front shaft 2. A shaft 10, loosely vertically fitted through the sliding block 9, has a mounting member 10a at the lower end thereof as an integral part to which the upper portion of the lens case is secured. A rotary disk 10b having a projection 10c, which is formed on the upper surface of the disk across the center of rotation of the same, is firmly fixed to the upper end of the shaft 10 concentrically with the same. The projection 10c is loosely fitted in the slot 7 of the link plate 8 to the full width of the slot.

Although not shown in FIG. 3, another assembly, of the same structure as the illustrated assembly for suspending a lens case for left eye described in the foregoing, is arranged on the left side of the reading rod 1 in FIG. 3 symmetrically for suspending a lens case for right eye.

All the parts drawn in solid line in FIG. 3 show their positions for long distance eye tests. When the screw-threaded shaft 3 is turned in either direction by knob or the like (not shown) fixed to the end of the same, the moving piece 4 is made to slide along the front shaft 2, and thereby the lens case fixed to the mounting member 10a shown in the lower portion of FIG. 3 moves towards or away from the upstanding reading rod 1. This movement of the lens case adjusts the interpupillary distance of the ophthalmic instrument in long distance tests. Pulling down of the reading rod 1 to the horizontal position indicated in phantom makes the front shaft 2 rotate together with the reading rod 1 and hence makes the cylinder 5 rotate with the shaft 2 without the such cylinder moving along the shaft 2. Accordingly the free front end of the link plate 8 is guided by the slot 6 of the cylinder 5 to rotate around the pin 8b planted in the rear end of the link plate until it reaches the position shown in phantom. Since during this process the sliding block 9 is permitted only to slide along the stationary frame means in a direction parallel with the front shaft 2, the projection 10c disposed on the top of the shaft 10 fitted through the sliding block 9 also slides within the slot 7 of the link plate 8 and arrives at the position drawn in phantom. Consequently the lens case (not shown) firmly secured to the mounting member 10a at the lower end of the vertical shaft 10 also moves turning inwardly. Thus, as readily understood from the movement of the sliding block 9, turning of the lens case and adjusting of interpupillary distance are simultaneously performed. It is clear that raising of the pulled-down reading rod 1 up to the position shown in solid line causes the other parts to move in the reverse directions to retake their original positions shown in solid line.

As fully described in the foregoing, according to the present invention, by merely raising up and pulling down the reading rod 1, the instrument automatically performs through the link system shown the turning of the lens cases and the adjusting of interpupillary distance.

The advantages of this device are simplification of operation in various eye tests and relief of the practitioner of any possibility of performing short distance tests with the lens cases at the positions for long-distance tests or, vice versa, performing long distance tests with the lens cases at the positions for short-distance tests.

What is claimed is:

1. A device for testing eyes comprising:
a horizontal rotatable shaft having an arm projecting therefrom for carrying an examination card, said rotatable shaft being provided with a spiral peripheral guide slot thereon at each eye position;
a swingable link means for each spiral guide slot, each link means having a pivot about which said link is adapted to be rotated and a pin engaged in one of said spiral guide slots, said link means each having a guide slot along its body portions, whereby said link means pivotally swing when said shaft is rotated; and
a vertical shaft for carrying a lens case at each eye position, each said vertical shaft being supported by a bearing member movable parallel to the axis of said horizontal shaft, each said vertical shaft having an upper part engaged with one of said guide slots of the link means, whereby when said projecting arm is moved, the vertical shafts for holding the lens cases are simultaneously adjusted with respect to the interpupillary distance and the angle of convergence.

2. A device in accordance with claim 1, further comprising a threaded shaft disposed parallel to said horizontal rotatable shaft, and moving pieces in threaded engagement with said threaded shaft at the eye positions, said spiral slots being provided on cylindrical members supported by said moving pieces and in slidable key engagement with said horizontal shaft to slide along said horizontal shaft with said moving piece and to rotate with said horizontal shaft with respect to said moving piece, whereby interpupillary distance can initially be adjusted by rotation of said threaded shaft.

References Cited

UNITED STATES PATENTS

| | | | |
|---|---|---|---|
| 675,739 | 6/1901 | Kantlehner | 351—28 |
| 1,033,965 | 7/1912 | Troppman | 350—145 |
| 3,029,696 | 4/1962 | Schmidt | 350—146 |

DAVID SCHONBERG, *Primary Examiner.*

PAUL A. SACHER, *Assistant Examiner.*